United States Patent Office 3,313,675
Patented Apr. 11, 1967

3,313,675
LAMINATE AND PROCESS OF PREPARING
THE SAME
John Christos Petropoulos, Norwalk, Conn., and Auguste Eugene Rimpel, Jr., Pittsburgh, Pa., assignors to Formica Corporation, Cincinnati, Ohio, a corporation of Delaware
No Drawing. Filed June 3, 1963, Ser. No. 284,855
12 Claims. (Cl. 161—184)

This invention relates to a process for making a laminate wherein cement-asbestos board is used as the substrate and is coated with a polyamine-epoxy resin composition followed by the superimposition of a thermosetting resin-impregnated fibrous sheet material and the consolidation of the assembly into a unitary structure. Still further, this invention relates to a laminate comprising a cement-asbestos board base member coated on at least one surface thereof with a polyamine-epoxy resin composition and bonded thereto a fibrous sheet material impregnated with a thermoset resin.

One of the objects of the present invention is to produce a laminated structure and particularly a decorative laminated structure using as the base member cement-asbestos board coated on at least one broad surface thereof with a polyamine-epoxy resin composition and having bonded thereto a fibrous sheet material impregnated with a thermoset resin.

A further object of the present invention is to produce a decorative laminated structure having highly desirable properties which permit its use in outdoor exposure. A further object of the present invention is to produce a laminated article which can withstand adverse weather conditions from the extremes of heat to cold, from dry to exceedingly humid. These and other objects of the present invention will be discussed in greater detail hereinbelow.

For many years laminated articles have been prepared by impregnating fibrous sheet material with thermosetting resins and preparing an assembly of a plurality of said impregnated sheets and consolidating the same by the use of heat and pressure to a unitary structure. Such a laminate is then bonded to a substrate and is useful in a substantial plurality of construction areas such as wall paneling, table tops, counter tops, doors and the like. Since nearly all of these laminates have been used indoors, no significant problem arose with respect to the weatherability of these laminates. The demand for an outdoor weather-resistant laminated panel has grown in such measure that it has become imperative to find the solutions to the many problems existent in the prior art indoor laminate panels.

A base member for these outdoor panels should be a material with a significant measure of dimensional stability, should be low in cost and be non-combustible. Such a base member must be immune from deterioration when exposed to the wide variations in temperatures experienced in the outdoor atmosphere especially in the more northern climates. Cement-asbestos board is a product which is commercially available and has substantially all of the properties required for a material to be used as a base or core member for outdoor weatherable laminates. Specifications for such board or sheet are included in the 1961 book of A.S.T.M. Standards, Part 5, beginning at pages 1 and 5. The cement-asbestos board product is therein described as being composed of a combination of asbestos fiber and Portland cement with or without the addition of curing agents, water-repellent substances, other mineral fillers, coatings, pigments, or mineral granules. The product is formed under pressure and cured. The boards or sheets are ordinarily essentially free of organic fiber. Numerous patents relating to the methods of manufacturing of or improvements in the cement-asbestos board have been issued, e.g., U.S. 2,446,762; 2,446,990 and 2,732,296, among others. Because of the composition of the cement-asbestos board, it has been found in the past to be a substrate onto which thermosetting resin-impregnated fibrous sheet materials were bonded only with great difficulty and with no appreciable measure of permanence. The cement-asbestos board, because of its alkaline characteristic, has a tendency to have an adverse effect on resinous materials applied thereto, particularly aminoplast resins, phenolic resins, polyester resinous materials and other resinous materials having ester linkages such as the polyacrylate resinous materials. The surface of the cement-asbestos board, if examined microscopically from a front elevational view, would exhibit a substantial plurality of protuberances and valleys. It will be explained in greater detail hereinbelow that the earlier steps in the process of treating the cement-asbestos board will be directed to applying a coating of a polyamine-epoxy resin composition to the surfaces of the cement-asbestos board in a given plane in such a manner as to apply a substantially continuous film to the protuberances and valleys without accomplishing any significant filling of the voids and interstices on the surface of the cement-asbestos board. This coating operation is accomplished by applying a comparatively dilute solution of the polyamine-epoxy resin composition to the board from a solvent medium and evaporating the solvent therefrom to leave a thin film coating on the surfaces of the board without filling the aforementioned voids, craters and interstices on the board. This film functions as a protective barrier for the subsequently applied thermosetting resin contained in the impregnated fibrous sheet material.

The epoxy resins which are used in combination with the polyamines as the coating composition for the cement-asbestos board are well known in the art and are commercially available. These epoxy resinous materials are prepared by reacting epichlorohydrin with isopropylidine di(4-hydroxyphenyl) known commercially as bis-phenol A. These epoxy resinous materials have a comparatively low molecular weight and have an epoxy equivalent varying between about 180 and 550. One illustration of a specific material in this category that can be used is the diglycidyl ether of bis-phenol A. Such a material containing molecules of slightly higher advancement will have an epoxy equivalent varying between about 180 and 195. This category of epoxy resinous material is commercially available. Another commercially available epoxy resinous material is one which has an epoxy equivalent of about 425 to about 550. The molecular weight of these resinous materials will vary between the molecular weight of diglycidyl ether of bis-phenol A and about 5,000, as a number average molecular weight determination.

The polyamines used in the epoxy resin composition of the present invention include all of the aliphatic and aromatic primary and secondary amines. Illustrative of these polyamines are ethylene diamine, diethylene triamine, triethylene tetramine, tetraethylene pentamine, m-phenylene diamine, o-phenylene diamine, p-phenylene diamine, melamine, urea, dicyandiamide and the like. These polyamines may be used either singly or in combination with one another. The amount of the amine used with the epoxy resinous material may be varied from about 0.3 $NH_2$ group per oxirane group and 1.1 $NH_2$ group per oxirane group. Preferably, one would use between about 0.6 $NH_2$ group per oxirane group and 0.8 $NH_2$ group per oxirane group. No significant advantage is to be gained by using more than about 1 $NH_2$ group per oxirane group. If the imino hydrogen atoms are reactive, however, they should be calculated into the potential amino hydrogen total in determining the total amount of amine to be used per oxirane equivalent.

In preparing the polyamine-epoxy resin composition for use in sizing the cement asbestos board, one would dissolve the two reactive components in any suitable inert organic solvent to the desired solids. The solids content may be varied from about 15% to about 40% and preferably 20% to about 35% by weight, based on the total weight of the resin solids and solvent. The solvents that may be used with the polyamine-epoxy resin composition are such as acetone, methyl ethyl ketone, diethyl ketone and aromatic solvents such as xylene, benzene, toluene, petroleum fractions and the like. When a more advanced epoxy resinous material is used such as one having an epoxy equivalent of about 425–550, the molecular weight is such as to provide, at a given solids content, a higher viscosity than would a comparable solids solution of an epoxy resinous material having an epoxy equivalent of only about 180–195. As a consequence, with the lower numbered epoxy equivalent materials, higher solids can be used at a selected viscosity, whereas when the higher numbered epoxy equivalent materials are used, lower solid contents can be used at a selected viscosity.

These solution of the polyamine-epoxy resin composition can be applied as a coating to the cement-asbestos board by any one of a plurality of known techniques, such as by brushing, roller coating, spraying and the like. When the coating has been applied to the cement-asbestos board, it is desirable to remove the solvent thereby leaving a substantially continuous film on the surface of the cement-asbestos board without any appreciable filling of the voids and interstices of the board surface. The solvent removal can readily be accomplished by subjecting the coated board to a heat treatment for a sufficient period of time to volatilize the solvent. This can be accomplished by use of a battery of infrared lamps or a forced draft oven, among other conventional pieces of apparatus. It has been found that the application of a plurality of coatings to the surface of the cement-asbestos board is more highly effective than is the application of one coating only. To accomplish this, one would coat the board in the conventional manner, drive off the solvent, apply a second coating followed by a drying step and subsequent coating and drying steps, if desired. During the drying step, the solvent is removed but additionally the polyamine-epoxy resin composition, due to the heating, is advanced somewhat in cure but fails to reach the state of complete cure. In other words, the resinous material is partially cured. The amount of resin applied to the board should be sufficient so as to impart a resin pick-up varying between about 0.013 gram/in.$^2$ to about 0.058 gram/in.$^2$ and preferably from about 0.020 gram/in.$^2$ to about 0.045 gram/in.$^2$. In making the pick-up determination, the actual lateral measurements of the planar surface of the board are used rather than to endeavor to calculate the actual area of surface available, due to the cross-sectional distribution of undulations, protuberances and valleys.

The reason for not wanting to fill the voids and interstices with the polyamine-epoxy resin composition is that after such coating is applied and dried, there is superimposed on the coated board a thermosetting resin-impregnated fibrous sheet material which is subsequently bonded to the coated board by the application of heat and/or pressure. This consolidation steps force the the resin impregnant in the fibrous sheet material to flow, since it is still in a thermosetting state and has not yet been converted to a thermoset state, down into the voids and interstices of the coated board, thereby effecting a strong bond between the board base member and the fibrous sheet material. If the voids and interstices are filled so as to provide a comparatively smooth, glossy surface, the board is not strong enough to withstand the rigors of weathering as determined by an artificial accelerated weathering test identified hereinbelow as the boil test. The fibrous sheet materials used in the present invention may be any one of a substantial plurality of materials commercially available for this purpose, including kraft paper, other cellulosic fiber paper such as α-cellulose foils, cotton fabrics, linen fabric, glass fiber fabrics, artificial or synthetic fiber fabrics, such as those prepared from polyacrylonitrile fibers, polyester resin fibers, linear superpolyamide fibers and the like. This fibrous sheet material may be in the form of a mat or web or may be in a woven state. Particularly advantageous for this purpose are papers prepared from a fibrillated wet gel polyacrylonitrile fiber such as is shown in the U.S. Patents 2,810,646 and 3,047,455. These fibrous sheet materials may be impregnated with one or more thermosetting resin compositions in a manner conventionally known in the art. One may utilize the aminoplast resins such as the urea-formaldehyde resins, the aminotriazine-aldehyde resins and more particularly the melamine-formaldehyde resins, benzoguanamine-formaldehyde resins and the like, the dicyandiamide-formaldehyde resins and the like. Additionally, one can make use of the phenolic resins or the unsaturated polyester resins or certain terpolymer latices prepared in an emulsion polymerization scheme from such monomers as methyl methacrylate; ethyl acrylate; methacrylic acid and the like. In using the phenolic resins to impregnate the fibrous sheet, one would generally bond such phenolic resin sheet to the substrate with a covering sheet of a nobler or lighter colored resin if the aesthetic value of the ultimate laminate is a factor. On the other hand, if the phenolic-impregnated sheet is used as a backing sheet to lend further dimensional stability to the base board where aesthetic appeal or decorative effect is not required, no additional covering sheet need be used. It is obvious from this that one could apply the process of the present invention to each of the flat sides of the cement-asbestos board and to bond to one side thereof a phenolic resin-impregnated fibrous sheet while to the other side there could be bonded directly or in combination with a phenolic resin sheet a sheet material impregnated with a lighter colored resin such as a melamine-formaldehyde resin. The aminotriazine resins and more particularly the melamine resins are well known in the art and are commercially available from a plurality of sources and are illustrated by the U.S. Patents 2,197,357 and 2,260,239. Wherever necessary, appropriate known catalytic materials can be used with these resinous materials along with other desirable additives, including dyes, pigments and the like. For decorative laminates, a print sheet is used carrying a design which is printed on the fibrous material either before or after the impregnation step. The amount of time, heat and pressure utilized during the laminating operation will be conventional as is known in the art and in industry and by way of illustration but not by way of limitation one will find 30 minutes at 150° C., 300 p.s.i. to be suitable for many laminating operations. Those skilled in the art know that higher or lower temperatures with shorter or longer times and greater or lesser pressures can be utilized.

In order that the concept of the present invention may be more completely understood, the following examples are set forth in which all parts are parts by weight. These examples are set forth primarily for the purpose of illustration and any specific enumeration of detail contained therein should not be interpreted as a limitation on the case except as is indicated in the appended claims.

*Example 1*

A cement-asbestos board surface is coated with a 30% solids solution of a mixture of m-phenylene diamine (80% theoretical equivalents) and diglycidyl ether of bis-phenol A in acetone. The coating is dried for 30 minutes at 150–200° C. A second coating is applied and dried in the same manner. A melamine-formaldehyde resin print sheet is superimposed over the coated cement-asbestos board and the assembly is laminated by pressing at 150° C. and 300 p.s.i. for 30 minutes. The initial bond is good but the boil test after 2 hours indicates that the print sheet can be pried apart from the base at the interface with a knife.

*Example 1A*

Example 1 is repeated in all details except the cement-asbestos board is not coated. No initial bond was produced.

*Example 2*

A cement-asbestos board surface is coated as in Example 1 with two coats of the m-phenylene diamine epoxy resinous material solution. A melamine-formaldehyde resin-impregnated print sheet is coated with one layer of a thermosetting acrylic emulsion comprising a blend of a terpolymer of 80 parts of methyl methacrylate, 10 parts of ethyl acrylate and 10 parts of methacrylic acid, blended with 20 parts of hexamethyl ether of hexamethylol melamine (40% solids) and the print sheet is dried in an oven at about 70° C. The coated print sheet is then laminated on the treated cement-asbestos board for 30 minutes at 150° C. and 300 p.s.i. An excellent bond is formed between the print sheet and the base member that withstands 3 hours' immersion in boiling water at the end of which time the bond cannot be pried apart between the melamine resin-impregnated paper and the cement-asbestos board interface with a knife.

*Example 3*

Example 2 is repeated in substantially all details except that the solids content of the epoxy amine solution is 80% solids. The initial bond was non-existent and therefore no boil test was conducted.

*Example 4*

A cement-asbestos board is coated as in Example 1 and cured each time for 30 minutes at 150–200° C. whereupon a phenolic resin-impregnated kraft sheet is superimposed over the coated cement-asbestos board surface and the entire assembly is consolidated into a unitary structure by laminating for 30 minutes at 150° C. and 300 p.s.i. The initial bond is good and the bond after a 3 hour boil test is good.

*Example 5*

Example 2 is repeated in substantially all details except that the amine epoxy coating was applied twice but was cured only once for one half hour at 200° C. with no drying between the first and second coats. The initial bond was good but after 1½ hours in the boil test, the bond was rated poor.

*Example 6*

Example 2 is repeated in substantially all details except that the emulsion terpolymer was comprised of 70 parts of the methyl methacrylate, 20 parts of the ethyl acrylate and 10 parts of the methacrylic acid. The initial bond was good and the bond after a 3 hour boil test was rated good.

*Example 7*

Example 6 is repeated in substantially all details except that the monomers entering into the terpolymer were 60 parts methyl methacrylate, 35 parts of ethyl acrylate and 5 parts of methacrylic acid. The initial bond was good and the bond after a 3 hour boil test was excellent.

*Example 8*

A cement-asbestos board is coated with a 30% solids solution of m-phenylene diamine (80% theoretical equivalents) and the diglycidyl ether of bis-phenol A in acetone two successive times with a curing treatment after each coating lasting for 30 minutes at 150–200° C. A phenolic resin-impregnated crepe paper is superimposed on the coated cement-asbestos board which in turn is then covered with a melamine-formaldehyde resin print sheet. The entire assembly is laminated for 30 minutes at 160° C. and 1100 p.s.i. The initial bond is good and the bond after a 15 minute and a 30 minute boil test is good.

*Example 9*

Example 8 is repeated in substantially all details except that additionally the melamine-formaldehyde resin print sheet is covered with a machine calendar fibrillated acrylic fiber sheet which had been preimpregnated with 250 parts of a 40% solids solution of a selfcross-linking polyester resin composition (prepared by reacting 247 parts of 1,3-butylene glycol, 792 parts of 1,4-cyclohexanedimethanol, 580 parts of fumaric acid, 385 parts of hexahydrophthalic acid in the presence of 2 parts of tertiary butyl catechol to an acid number of 10.8). The polyester resin was dissolved in toluene to form a 70% solids solution and catalyzed with 1.33 parts of 2,5-dimethyl-2,5-di(tertiary butyl peroxy) hexane, 0.67 part of tertiary butyl hydroperoxide and 0.0167 part of cobalt as cobalt naphthenate. The dried acrylic fiber sheet impregnated with the partially cured polyester resin is laminated with the assembly at 600 p.s.i. and at 160° C. for 30 minutes. The bond produced by this laminating procedure withstood 2 hours immersion in boiling water without delamination and the appearance of the sample was unchanged after 1500 hours exposure in an accelerated weathering device. The resulting laminate is an attractive, rigid panel suitable for use in an exterior building application.

*Example 10*

Example 9 is repeated in substantially all details except that in the place of the melamine-formaldehyde resin print sheet there is substituted a phenolic resin-impregnated kraft paper sheet. In the final assembly, the laminate is composed of the base member, i.e., the cement-asbestos board coated with the epoxy resin to which is bonded the phenolic resin paper sheet and on top of which is the fibrillated polyacrylonitrile fiber print sheet impregnated with the selfcross-linking polyester resin composition. The unitary structure withstood prolonged immersion in boiling water without delamination and was an attractive, rigid panel suitable for use in an exterior building application.

As an added measure of protection for the laminates of the present invention, particularly for use in outdoor exposures, one can bond to the decorative sheet, an overlay sheet which may be any one of a substantial plurality of protective barriers such as a resin impregnated foil and more particularly a melamine resin foil or a sheet or film of polymethyl methacrylate or a sheet of polyvinyl fluoride or a sheet or film of polymethyl fluoro acrylate or a sheet or film of a polyester resin and the like. Additionally one may use a thermosetting or thermoplastic polyester resin impregnated fibrous sheet wherein said sheet is prepared from synthetic fibers and particularly fibrillated wet gel polyacrylonitrile fibers referred to hereinabove among other fibrous sheets.

The amount of the resin load in the decorative print sheet may be varied from about 30% to 60% by weight of the resin solids based on the total weight of the impregnated sheet. For the overlay sheet the total amount of resin solids may be varied between about 50% and 80% by weight of resin solids based on the total weight of the overlay sheet. These are conventional amounts in the art of print and overlay sheets.

The boil test referred to hereinabove is an artificially accelerated weathering test in which the laminated article is immersed in boiling water for the periods of time indicated. It is a rough measure of the weather durability of the panels. By way of correlation, samples which delaminated after 20 minutes in the boil test were compared with identical samples that were exposed to outdoor weathering for 18 months without any delamination. As a consequence, a laminate which will endure a boil test for 20 minutes will endure outdoor exposure for a period significantly greater than 18 months. Samples that withstand the boil test for a 3-hour period or longer would be expected to withstand outdoor weather for a period greater than 13 years.

The cement-asbestos board used in the present invention is commercially available in a plurality of thicknesses such as ¼", ⅛" and the like. Specially made boards could be of even greater thickness such as ³⁄₁₆", ⁵⁄₁₆", ½" and the like.

With respect to the selfcross-linking polyester resins used in Example 9, these are more fully described in the U.S. patent application having the Serial Number 270,180 filed Apr. 3, 1963.

We claim:

1. A process for preparing a laminate comprising coating a cement-asbestos board with a solution of a polyamine-epoxy resin composition and evaporating the solvent so as to leave deposited on the face of said cement-asbestos board a partially cured resin in an amount varying between about 0.013 gram/in.$^2$ to about 0.058 gram/in.$^2$ and covering said coated board with a thermosetting resin-impregnated fibrous sheet and heat and pressure consolidating said board and sheet to form a unitary laminated article wherein said epoxy resin is prepared by reacting bis phenol with epichlorohydrin and has an epoxy equivalent varying between about 180 and 550, wherein said polyamine is selected from the group consisting of aliphatic and aromatic primary and secondary polyamines and wherein the coating is sufficient to provide a film on the surface of said cement-asbestos board without significantly filling the voids and interstices on said surface.

2. A process for preparing a laminate comprising coating a cement-asbestos board with a solution of a polyamine-epoxy resin composition and evaporating the solvent so as to leave deposited on the face of said cement-asbestos board a partially cured resin in an amount varying between about 0.013 gram/in.$^2$ to about 0.058 gram/in.$^2$ and covering said coated board with a melamine-formaldehyde resin-impregnated fibrous sheet and heat and pressure consolidating said board and sheet to form a unitary laminated article wherein said epoxy resin is prepared by reacting bis phenol with epichlorohydrin and has an epoxy equivalent varying between about 180 and 550, wherein said polyamine is selected from the group consisting of aliphatic and aromatic primary and secondary polyamines and wherein the coating is sufficient to provide a film on the surface of said cement-asbestos board without significantly filling the voids and interstices on said surface.

3. A process for preparing a laminate comprising coating a cement-asbestos board with a solution of polyamine-epoxy resin composition and evaporating the solvent so as to leave deposited on the face of said cement-asbestos board a partially cured resin in an amount varying between about 0.013 gram/in.$^2$ to about 0.058 gram/in.$^2$ and covering said coated board with a melamine-formaldehyde resin-impregnated fibrous decorative sheet coated with a terpolymer of methyl methacrylate, ethyl acrylate and methacrylic acid and heat and pressure consolidating said board and sheet to form a unitary laminated article wherein said epoxy resin is prepared by reacting bis phenol with epichlorohydrin and has an epoxy equivalent varying between about 180 and 550, wherein said polyamine is selected from the group consisting of aliphatic and aromatic primary and secondary polyamines and wherein the coating is sufficient to provide a film on the surface of said cement-asbestos board without significantly filling the voids and interstices on said surface wherein said terpolymer coating is deposited on the decorative side of said decorative sheet.

4. A process for preparing a laminate comprising coating a cement-asbestos board with a solution of polyamine-epoxy resin composition and evaporating the solvent so as to leave deposited on the face of said cement-asbestos board a partially cured resin in an amount varying between about 0.013 gram/in.$^2$ to about 0.058 gram/in.$^2$ and covering said coated board with a phenolic resin-impregnated fibrous sheet which in turn is covered with a thermosetting resin-impregnated fibrous sheet and heat and pressure consolidating said board and sheets to form a unitary laminated article wherein said epoxy resin is prepared by reacting bis phenol with epichlorohydrin and has an epoxy equivalent varying between about 180 and about 550, wherein said polyamine is selected from the group consisting of aliphatic and aromatic primary and secondary polyamines and wherein the coating is sufficient to provide a film on the surface of said cement-asbestos board without significantly filling the voids and interstices on said surface.

5. The process according to claim 1 wherein the solution of the epoxy resin is applied to the cement-asbestos board a plurality of times and is partially cured between each application.

6. A consolidated unitary laminate structure comprising as a base member, a cement-asbestos board, a coating of substantially completely cured polyamine bis phenol-epichlorohydrin resin composition on said cement-asbestos board, a substantially thermoset resin-impregnated fibrous sheet, wherein the bis phenol-epichlorohydrin resin as applied has an epoxy equivalent varying between about 180 and about 550 before cure, wherein said polyamine is selected from the group consisting of aliphatic amine and aromatic primary and secondary polyamines and wherein the coating of the polyamine-epoxy resin is sufficient to provide a film on the surface of said cement-asbestos board without significantly filling the voids and interstices on said surface.

7. The laminate according to claim 6 wherein the thermoset resin impregnated into the fibrous sheet is a melamine-formaldehyde resin.

8. The laminate according to claim 7 wherein a phenolic resin-impregnated fibrous sheet is interposed between the coated base member and the melamine resin-impregnated sheet.

9. The laminate according to claim 7 wherein the melamine resin-impregnated fibrous decorative sheet is coated on the decorative side of said decorative sheet with a terpolymer of methyl methacrylate, ethyl acrylate and methacrylic acid.

10. The laminate according to claim 7 wherein a protective sheet is bonded to and covers the impregnated fibrous sheet.

11. The laminate according to claim 8 wherein a protective sheet is bonded to and covers the impregnated fibrous sheet.

12. The laminate according to claim 9 wherein a protective sheet is bonded to and covers the impregnated fibrous sheet.

References Cited by the Examiner

UNITED STATES PATENTS

| | | | |
|---|---|---|---|
| 1,309,758 | 7/1919 | Kempton | 161—205 |
| 1,941,985 | 1/1934 | Holcomb | 161—205 X |
| 2,769,742 | 11/1956 | Helbing | 156—246 |
| 2,801,198 | 7/1958 | Morris et al. | 161—246 |
| 3,018,206 | 1/1962 | Hood et al. | 156—331 X |
| 3,032,460 | 5/1962 | Chipman et al. | 161—184 |

EARL M. BERGERT, *Primary Examiner.*

HAROLD ANSHER, *Examiner.*